United States Patent
Li et al.

(10) Patent No.: US 11,847,291 B1
(45) Date of Patent: Dec. 19, 2023

(54) TOUCH FILM LAYER AND TOUCH DISPLAY PANEL

(71) Applicant: HKC CORPORATION LIMITED, Shenzhen (CN)

(72) Inventors: Wang Li, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/233,859

(22) Filed: Aug. 14, 2023

(30) Foreign Application Priority Data

Nov. 4, 2022 (CN) .......................... 202211373254.9

(51) Int. Cl.
*G06F 3/044* (2006.01)
*G06F 3/041* (2006.01)

(52) U.S. Cl.
CPC .......... *G06F 3/0448* (2019.05); *G06F 3/0446* (2019.05); *G06F 3/04164* (2019.05); *G06F 2203/04102* (2013.01)

(58) Field of Classification Search
CPC ......... G06F 3/0443; G06F 2203/04111; G06F 2203/04112; G06F 3/044; G06F 3/0448; G06F 3/04164; G06F 3/0446; G06F 2203/04102
See application file for complete search history.

(56) References Cited

U.S. PATENT DOCUMENTS

| | | | | |
|---|---|---|---|---|
| 11,119,591 B2* | 9/2021 | Hong | .................... | G06F 3/0446 |
| 2014/0362027 A1* | 12/2014 | Hsu | .................... | G06F 3/04164 |
| | | | | 345/174 |
| 2015/0042598 A1* | 2/2015 | Chae | .................... | G06F 3/041 |
| | | | | 345/174 |
| 2015/0212548 A1* | 7/2015 | Namkung | ............. | G06F 3/0445 |
| | | | | 345/173 |
| 2015/0293629 A1* | 10/2015 | Ryu | .................... | G06F 3/0448 |
| | | | | 345/174 |

(Continued)

FOREIGN PATENT DOCUMENTS

| CN | 106486491 A | 3/2017 |
|---|---|---|
| CN | 106816460 A | 6/2017 |

(Continued)

OTHER PUBLICATIONS

Qing Ji, the ISA written comments, Jul. 2023, CN.
Qing Ji, the International Search Report, Jul. 2023, CN.

*Primary Examiner* — Amy Onyekaba

(57) ABSTRACT

A touch film layer and a touch display panel are disclosed. The touch film layer includes a touch electrode layer, which includes multiple first touch electrode groups and second touch electrode groups. Multiple first touch electrodes arranged along a first direction are connected to form a first touch electrode group, and multiple second touch electrodes arranged along a second direction are connected to form a second touch electrode group. The first direction intersects the second direction to form an included angle of 90±30 degrees. The second direction is defined as a direction in which the touch film layer is curled or bent. The first and the second touch electrodes are strip-shaped electrodes. A long axis or long side of each strip-shaped electrode is parallel to the first direction, and a short axis or short side thereof is parallel to the second direction.

17 Claims, 8 Drawing Sheets

(56) References Cited

U.S. PATENT DOCUMENTS

| | | | |
|---|---|---|---|
| 2016/0179268 A1* | 6/2016 | Hong | G06F 3/041 |
| | | | 345/174 |
| 2017/0062532 A1* | 3/2017 | Jeong | H10K 59/131 |
| 2017/0228081 A1 | 8/2017 | Jin | |
| 2017/0277316 A1* | 9/2017 | Teranishi | H10K 59/40 |
| 2017/0364187 A1* | 12/2017 | Zhai | G09F 9/301 |
| 2018/0046005 A1* | 2/2018 | Yoon | G02F 1/13338 |
| 2018/0197924 A1* | 7/2018 | Tada | H10K 71/00 |
| 2018/0253175 A1* | 9/2018 | Yao | G06F 3/0445 |
| 2019/0171315 A1* | 6/2019 | Park | G06F 3/0445 |
| 2020/0272281 A1* | 8/2020 | Zhang | G06F 3/0416 |
| 2021/0200381 A1* | 7/2021 | Kang | G06F 3/0412 |
| 2021/0271298 A1* | 9/2021 | Chen | G06F 3/0443 |
| 2021/0325999 A1* | 10/2021 | Liu | G06F 3/0446 |
| 2022/0308702 A1* | 9/2022 | Wang | G06F 3/0448 |
| 2023/0168776 A1* | 6/2023 | Liu | G06F 3/044 |
| | | | 345/173 |
| 2023/0205377 A1* | 6/2023 | Wang | G06F 3/0443 |
| | | | 345/173 |

FOREIGN PATENT DOCUMENTS

| | | |
|---|---|---|
| CN | 106952938 A | 7/2017 |
| CN | 107450772 A | 12/2017 |
| CN | 108008862 A | 5/2018 |
| CN | 109002205 A | 12/2018 |
| CN | 114026894 A | 2/2022 |
| CN | 115421618 A | 12/2022 |

\* cited by examiner

TOUCH FILM LAYER AND TOUCH DISPLAY PANEL

CROSS-REFERENCE TO RELATED APPLICATIONS

This application claims the priority and benefit of Chinese patent application number CN2022113732549, entitled "Touch Film Layer and Touch Display Panel" and filed Nov. 4, 2022, with China National Intellectual Property Administration, the entire contents of which are incorporated herein by reference.

TECHNICAL FIELD

The present application relates to the field of display technology, in particular to a touch film layer and a touch display panel.

BACKGROUND

Nowadays, the development prospect of organic light-emitting (OLED) technology is very optimistic. With the continuous updating of electronic products, the proportion of OLED screen technology used in current display panels is becoming higher and higher, and users' expectations for flexible screens are also getting higher and higher. Generally speaking, in addition to the display panel, the flexible screen further includes a touch panel. Also benefiting from the continuous development of touch sensing technology, display devices such as mobile phones and tablet computers are equipped with touch panels. Common touch solutions include resistive, capacitive, and optical. The most mainstream adopts mutual capacitive touch solution, which has the advantages of weak touch signal, low power consumption and low touch IC cost.

However, when it is used for a foldable screen or a rollable screen, since the foldable screen and the rollable screen need to be bent, there are two usage states before and after curling. For the touch film layer, it is easy to break the film layer when it is bent, resulting in the problem that the touch function fails.

SUMMARY

In view of the above, it is therefore one purpose of the present application to provide a touch film layer and a touch display panel, so as to improve the problem that the touch film layer is easily broken during the rolling process of the foldable screen or scroll screen.

This application discloses a touch film layer, including a touch electrode layer. The touch electrode layer includes multiple first touch electrode groups and multiple second touch electrode groups. A plurality of first touch electrodes arranged along a first direction are connected to form a first touch electrode group. A plurality of second touch electrodes arranged along a second direction are connected to form a second touch electrode group. The first direction intersects the second direction to form an included angle of 90 degrees±30 degrees. The second direction is defined as the direction in which the touch film layer is curled or bent. The first touch electrodes and the second touch electrodes are strip-shaped electrodes. A long axis or long side of the strip-shaped electrode is parallel to the first direction. A short axis or short side of the strip-shaped electrode is parallel to the second direction.

The present application discloses a touch film layer, which includes a touch electrode layer. the touch electrode layer includes a plurality of first touch electrode groups and a plurality of second touch electrode groups. Each first touch electrode group is formed by a plurality of first touch electrodes arranged along a first direction that are connected together, and each second touch electrode group is formed by a plurality of second touch electrodes arranged along a second direction that are connected together. The first direction intersects the second direction to form an included angle of 90 degrees±30 degrees. The second direction is defined as a direction in which the touch film layer is curled or bent. The plurality of first touch electrodes and the plurality of second touch electrodes are strip-shaped electrodes. A long axis or long side of each strip-shaped electrode is parallel to the first direction, and a short axis or short side of each strip-shaped electrode is parallel to the second direction.

In some embodiments, at least one first slit is defined in each strip-shaped electrode, and the at least one first slit is oriented along the first direction. When the touch film layer is curled along the second direction, a slit width of the first slit becomes greater, and the strip-shaped electrode is separated into at least two sub-electrodes. Two ends of one of the two sub-electrodes in the first direction of the strip-shaped electrode are electrically connected to two ends of the other of the two sub-electrodes in the first direction, respectively.

In some embodiments, when there is defined only one first slit in each strip-shaped electrode, a central point of the first slit coincides with a central point of the respective strip-shaped electrode, and a length of the first slit is less than a length of the respective strip-shaped electrode in the first direction.

In some embodiments, when there are defined at least two first slits in each strip-shaped electrode, the strip-shaped electrode further includes at least one second slit oriented along the first direction, where each of the at least one second slit is disposed between two adjacent first slits, and the second slit is equidistant from the two adjacent first slits. The second slit includes a first segment and a second segment, where the first segment extends from a short side of the respective strip-shaped electrode along the first direction, the second segment extends from another side of the respective strip-shaped electrode along the first direction, and where the first segment and the second segment are collinear and not connected.

In some embodiments, each strip-shaped electrode is rectangular, or quadrilateral, or elliptical, or elongated with arc edges. A ratio of a length of the long side or long axis of each strip-shaped electrode to a length of the short side or short axis is greater than or equal to 2:1, and a length of the long side or long axis of each strip-shaped electrode lies in the range of 3.5 mm-5.5 mm.

In some embodiments, in the second direction, a plurality of columns of the first touch electrodes and a plurality of columns of the second touch electrodes are alternately arranged at intervals. In the first direction, the first touch electrodes and the second touch electrodes are staggered.

In some embodiments, when each strip-shaped electrode is elongated with arc edges, the strip-shaped electrode is narrow in the middle and wide at both ends, and where a narrowest portion of the strip-shaped electrode has a width that lies in the range of 0.5 to 1.2 mm.

In some embodiments, each strip-shaped electrode includes an upper short side and a lower short side that run parallel to the second direction, and a left arc edge and a right arc edge that connected the upper short side and the lower short side together. Both the left arc edge and the right arc edge are recessed inwardly, and are arranged symmetrically with respect to a midline of the upper short side and the lower short side, and where a line connecting midpoints of the left arc edge and the right arc edge is the narrowest portion of the strip-shaped electrode. A width of each strip-shaped electrode along the first direction has a value greater than or equal to 2 mm.

In some embodiments, the touch film layer further includes an insulation layer and a metal layer, where the insulation layer is arranged between the touch electrode layer and the metal layer. The metal layer comprises a plurality of second connection wires, which are metal connection bridges. Two ends of each of the second connection wires are respectively connected to two adjacent second touch electrodes arranged along the second direction through via holes, and where each second connection wire is connected to a position of the respective second touch electrode that is relatively far away from the narrowest portion of the respective strip-shaped electrode.

The present application further discloses a touch display panel, which includes a flexible display panel and the above-mentioned touch film layer, where the touch film layer is arranged on a light-emitting surface of the flexible display panel.

Compared with the scheme of setting diamond-shaped touch electrodes in the exemplary technology, in the present application, the touch electrodes in the touch film layer are arranged as a pattern of strip-shaped electrodes, and the short sides of the strip-shaped electrodes are set corresponding to the direction in which the touch film layer is curled. When the touch film layer is curled, the short side of the touch electrode is relatively short, which is not easy to break. The long side is correspondingly perpendicular or roughly perpendicular to the second direction, and is even less likely to be broken. Therefore, without reducing the area of the touch electrodes, by changing the shape of the touch electrodes, the present application can avoid the situation that the film layer is passively cracked, resulting in uncontrollable cracked lines, resulting in damage to the touch electrodes. Furthermore, through the arrangement of the touch electrodes of the present application, the touch pattern can be deformed to increase the stretch resistance, the screen body can withstand greater stress, so as to meet the requirement of a smaller bending radius, so that the degree of curling can be larger, which is conducive to reducing the size of the whole machine.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

Figure 1:
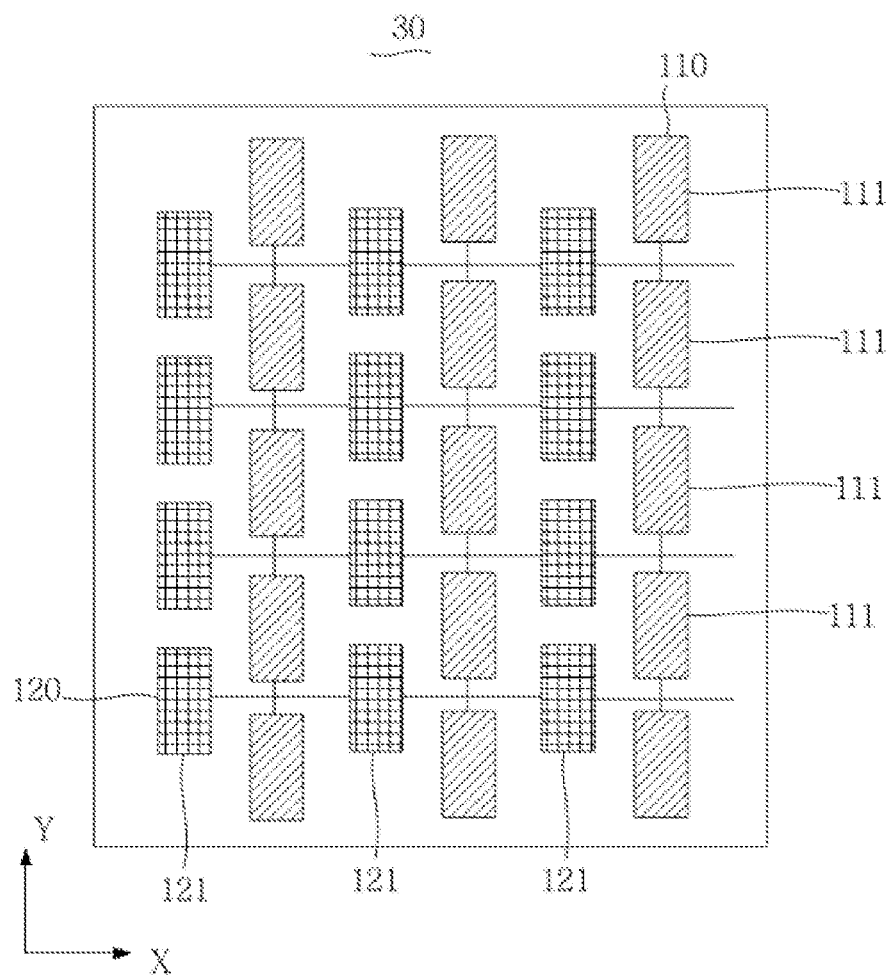
FIG. 1 is a schematic diagram of a touch film layer according to the present application.

In the drawings: 10, touch display panel; 20, flexible display panel; 30, touch film layer; 100, touch electrode layer; 110, first touch electrode group; 111, first touch electrode; 112, first connection wire; 113, third connection wire; 114, first touch channel; 120, second touch electrode group; 121, second touch electrode; 122, second connection wire; 130, strip-shaped electrode; 131, sub-electrode; 132, upper short side; 133, lower short side; 134, left arc edge; 135, right arc edge; 140, first slit; 141, second slit; 141*a*, first segment; 141*b*, second segment; 150, insulation layer; 151, metal layer.

DETAILED DESCRIPTION OF EMBODIMENTS

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of", and the like mean two or more. In addition, terms "up", "down", "left", "right", "vertical", and "horizontal", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure. For those of ordinary skill in the art, the specific meanings of the above terms as used in the present application can be understood depending on specific contexts.

Hereinafter this application will be described in further detail with reference to the accompanying drawings and some optional embodiments.

FIG. 1 is a schematic diagram of a touch film layer according to the present application. As shown in FIG. 1, the present application discloses a touch film layer, including a touch electrode layer 100. The touch electrode layer 100 includes multiple first touch electrode groups 110 and multiple second touch electrode groups 120. A plurality of first touch electrodes 111 arranged along the first direction Y are connected to form a first touch electrode group 110. A plurality of second touch electrodes 121 arranged along the second direction X are connected to form a second touch electrode group 120. The first direction Y intersects the second direction X to form an included angle of 90 degrees±30 degrees. The first touch electrodes 111 and the second touch electrodes 121 are all strip-shaped electrodes 130. The long axis or long side of the strip-shaped electrode 130 is parallel to the first direction Y. The short axis or short side of the strip-shaped electrode 130 is parallel to the second. direction X. The second direction X is defined as the direction in which the touch film layer 30 is curled or bent.

In this application, the touch electrodes in the touch film layer 30 are arranged as a pattern of strip-shaped electrodes 130, and the short sides or short axes of the strip-shaped electrodes 130 are set corresponding to the direction in which the touch film layer 30 is curled. When the touch film layer 30 is curled, the short side of the touch electrode is relatively short, and so is not easy to break. The long side is correspondingly perpendicular or roughly perpendicular to the second direction, and is even less likely to be broken. Therefore, without reducing the area of the touch electrodes, by changing the shape of the touch electrodes, the present application can avoid the situation that the film layer is passively cracked, resulting in uncontrollable cracked lines, resulting in damage to the touch electrodes. Furthermore, through the arrangement of the touch electrodes of the present application, the touch pattern can be deformed to increase the stretch resistance, the screen body can withstand greater stress, and the requirement for a smaller bending radius can be achieved, so that the degree of curling can be greater, which is conducive to reducing the size of the whole device.

In this embodiment, the first direction Y is perpendicular to the second direction X, or they are approximately in a perpendicular state. The maximum range can be offset to 60 degrees to 120 degrees.

Specifically, the shape of the strip-shaped electrodes 130 in this embodiment may be a rectangle, an elongated strip with arc edges, an ellipse, or a quadrangle, and so on. When the strip-shaped electrodes 130 are quadrangular or rectangular, etc., the strip-shaped electrodes 130 each have a long side and a short side. When the strip-shaped electrode 130 is oval or elongated, the strip-shaped electrode 130 has a long axis and a short axis. Further, the ratio of the length of the long side or the length of the long axis to the length of the short side or the length of the short axis of the strip-shaped electrode 130 is greater than or equal to 2:1. The length of the long side or long axis of the strip-shaped electrode 130 is 3.5 mm-5.5 mm. The purpose of setting the length of the long side of the strip-shaped electrode 130 to this value is to ensure a certain touch accuracy and ensure a better experience for the user when touching. The length of the short side may be set as small as possible to ensure that the short side is not easy to break when curled or bent. But we'll try to ensure that the width of the short side is at least about 2 mm or within 2 mm, so that the narrower short side can also cooperate with the long side to ensure that the area of the touch electrode is sufficient for accurate touch recognition.

In one embodiment, the strip-shaped electrode 130 is an elongated strip with arc edges, specifically narrow in the middle and wide at both ends, where the narrowest part of the strip-shaped electrode 130 is 0.5 to 1.2 mm. In this case, since the two ends of the strip-shaped electrode 130 are enlarged, the two ends of the touch electrode can be recognized. The middle part of the strip-shaped electrode 130 can be further narrowed, so as to further ensure that the short side is not easy to break when it is curled or bent. Of course, since the two ends of the strip-shaped electrode 130 are enlarged, the enlarged parts are more likely to be broken when curled or bent. But in this case, even if the two ends of the strip-shaped electrode 130 are cracked, the middle part of the strip-shaped electrode 130 still keeps the two ends connected, and the strip-shaped electrode 130 is still a whole, and so it can still maintain touch recognition and detection, ensuring the accuracy of touch recognition. Therefore, further narrowing the middle part of the strip-shaped electrode 130 can prevent cracking during curling or bending.

Figure 2:
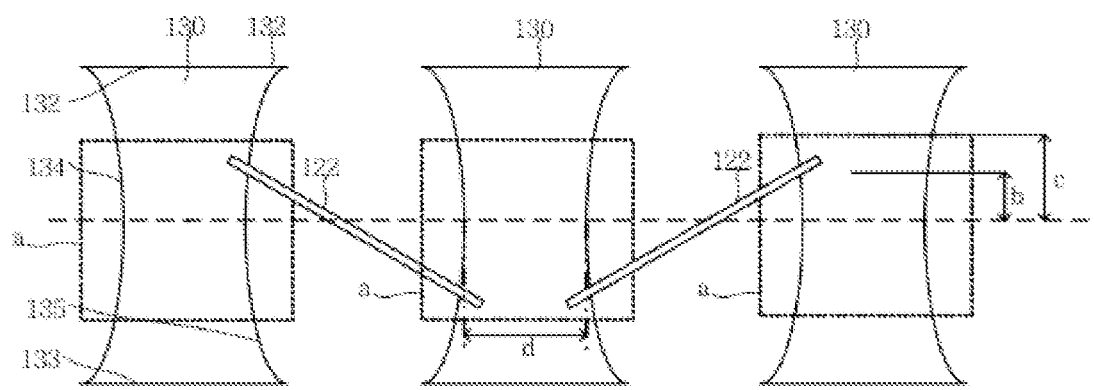
FIG. 2 is a schematic diagram of a first strip-shaped electrode according to the present application.

FIG. 2 is a schematic diagram of a first strip-shaped electrode according to the present application. As shown in FIG. 2, it is a further preferred solution of the strip-shaped electrode 130 that is narrow in the middle and wide at both ends. In this embodiment, the strip-shaped electrode 130 includes an upper short side 132 and a lower short side 133 along the second direction, and further a left arc edge 134 and a right arc edge 135 connecting the upper short side 132 and the lower short side 133 together. Both the left arc edge 134 and the right arc edge 135 are recessed inwardly, and the left arc edge 134 and the right arc edge 135 are arranged symmetrically with a midline passing through the upper short side 132 and the lower short side 133. A center line connecting the midpoints of the left arc edge 134 and the right arc edge 135 is the narrowest portion d of the strip-shaped electrode 130, where d=0.5-1.2 mm. The width of the strip-shaped electrode 130 along the first direction is greater than or equal to 2 mm. When this design is adopted, the touch pattern is relatively regular, and the geometric center of the strip-shaped electrode 130 is located at the very center. In this case, a straight line passing through the geometric center and parallel to the second direction is the narrowest position of the strip-shaped electrode 130, and the middle of the strip-shaped electrode 130 along the first direction is the narrowest position of the strip-shaped electrode 130. In this case, since the two ends of the strip-shaped electrode 130 have a width of 2 mm, the two ends of the strip-shaped electrode 130 are not easy to crack. The middle part of the strip-shaped electrode 130 is easy to be disconnected when it is connected with the metal connection bridge due to its narrowness, so in this case, the metal connection bridge is connected to a position away from the middle of the strip-shaped electrode 130 to ensure a stable connection between the metal connection bridge and the touch electrode.

When the strip-shaped electrode in this embodiment is used as the second touch electrode, in this embodiment, the touch film layer further includes an insulation layer 150 and a metal layer 151. The insulation layer 150 is disposed between the touch electrode layer and the metal layer 151. The metal layer 151 includes a plurality of second connection wires. The second connection wire is a metal connection bridge. Both ends of the second connection wire are respectively connected to two adjacent second touch electrodes arranged along the second direction through via holes. In this embodiment, since the middle part of the strip-shaped electrode is the narrowest, the middle part of the strip-shaped electrode is least likely to be broken, so the two ends of the metal connection bridge can be connected to the middle part of the strip-shaped electrode. However, because the middle part of the strip-shaped electrode is relatively narrow, the metal connection bridge and the middle part of the strip-shaped electrode are likely to be disconnected during actual processing, resulting in poor contact. It is also considered that the two ends of the strip-shaped electrode are easily disconnected, and poor contact with the metal connection bridge will also occur. Therefore, in another embodiment, the metal connection bridge can be connected to the middle of the upper end or the lower end of the strip-shaped electrode, which can as much as possible avoid poor contact caused by the narrower part of the middle and easy breakage at both ends, and ensure the connection stability between the metal connection bridge and the touch electrode. Further, the connection position with the metal connection bridge can be set close to the middle by a distance of ⅓ to ½ of the strip-shaped electrode. As shown in FIG. 2, b is ⅓ of half the length of the strip-shaped electrode, c is ½ of the half length of the strip-shaped electrode, and the connection position of the metal bridge is set in the area between b and c. In this embodiment, the width of the strip-shaped electrode is greater than 1 mm near the middle part of the strip-shaped electrode by ⅓ to ½. The strip-shaped electrode at this position is not easy to break, and can prevent the connection between the strip-shaped electrode and the second connection wire from breaking, which otherwise may lead to connection failure. The metal connection bridge may be arranged at an inclination angle to the second direction, and adjacent metal connection bridges may have different inclination angles. In this way, the frontal visibility of the metal connection bridge or the touch layer can be reduced.

Figure 3:
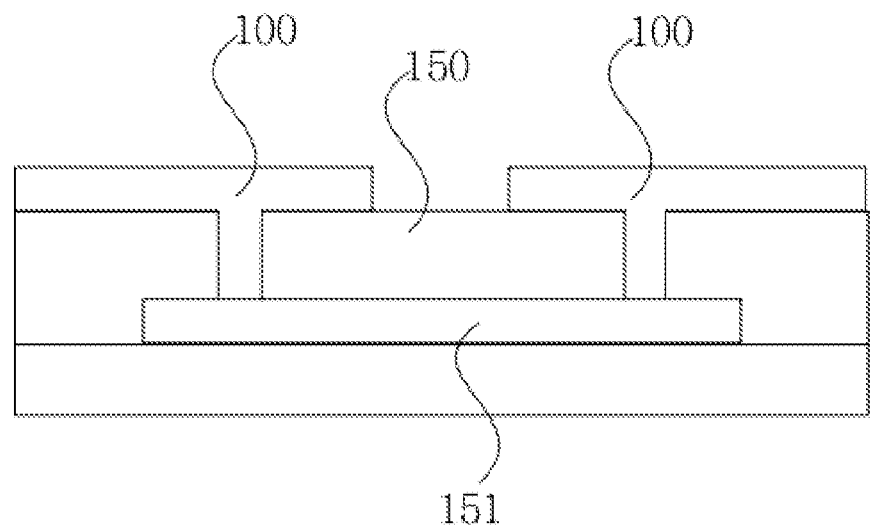
FIG. 3 is a schematic cross-sectional view of FIG. 2.

FIG. 3 is a schematic cross-sectional view of FIG. 2 of the present application. As shown in FIG. 2, the insulation layer 150 is disposed on the metal layer 151, the touch electrode layer is disposed on the insulation layer 150, and a via hole is defined in the insulation layer 150. The touch electrode layer is connected to the metal layer 151 through the via hole, and the corresponding metal connection bridge connects two adjacent second touch electrodes. In another embodiment, the metal layer 151 can also be disposed on the touch electrode layer.

Figure 4:
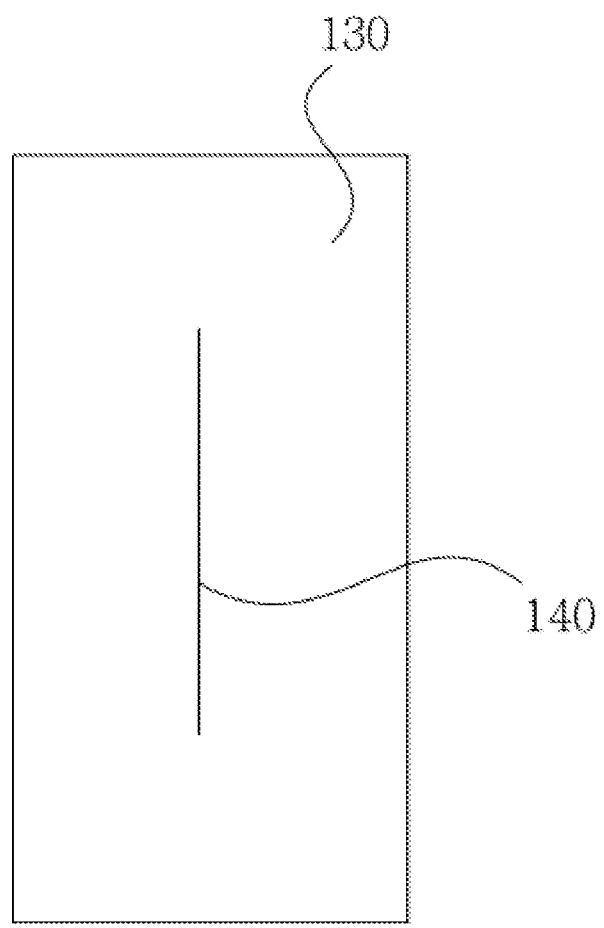
FIG. 4 is a schematic diagram of a second strip-shaped electrode according to the present application.

FIG. 4 is a schematic diagram of a second strip-shaped electrode according to the present application. As shown in FIG. 4, at least one first slit 140 is provided inside the strip-shaped electrode 130. The first slit 140 is arranged along the first direction Y. When the touch film layer 30 is rolled along the second direction X, the slit width of the first slit 140 becomes larger, and separates the strip-shaped electrode 130 into at least two sub-electrodes 131. Both ends of the two sub-electrodes 131 are electrically connected in the direction along which the long side of the strip-shaped electrode 130 is located.

In this application, a slit is provided in the strip-shaped electrode 130. When the touch film layer 30 is curled, the strip-shaped electrode 130 deforms at the slit position, the width of the slit becomes larger, and the sub-electrodes 131 on both sides of the slit move outward. By actively setting the slit, the strip-shaped electrode 130 is actively moved when curled, and during the movement, the two sub-electrodes 131 of the strip-shaped electrode 130 are always in a connected state at both ends, which will not damage the touch electrodes.

Figure 5:
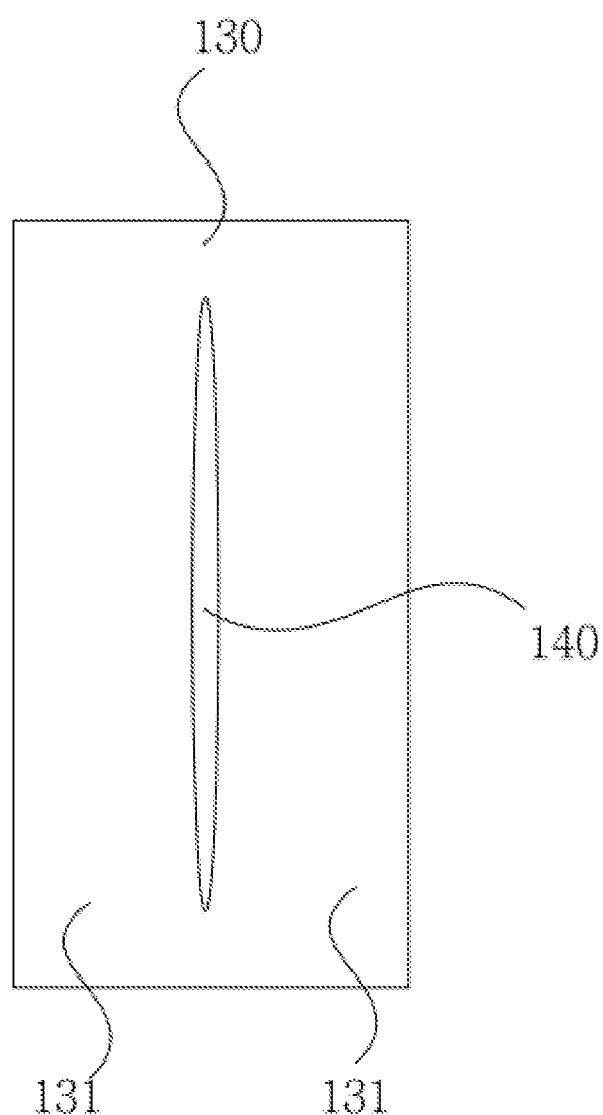
FIG. 5 is a schematic diagram of the second strip-shaped electrode according to the present application in a curled state.

FIG. 5 shows a schematic diagram of the second strip-shaped electrode according to the present application in a curled state. The width of the first slit 140 becomes larger, and the width of the first slit 140 is the largest in the central region of the strip-shaped electrode 130. Towards the two ends of the strip-shaped electrode 130, the width of the first slit 140 gradually becomes smaller. At both ends of the strip-shaped electrode 130, the two sub-electrodes 131 are connected to each other, and the first slit 140 does not completely separate the strip-shaped electrode 130 into two completely independent sub-electrodes 131. More importantly, when the touch electrode changes from the curled state back to the original state, the strip-shaped electrode 130 can recover to the strip shape along the deformation reverse process.

It should be understood that the curling of the touch film layer 30 mentioned in this application means, for example, that the film layer at the folded or bent position will be stretched when the foldable screen is folded or unfolded. For example, with a scroll screen, when the screen is rolled up, the excess screen part needs to be curled and shrunk inside the display, and the film layer at the curled position will also be stretched. The touch electrodes are of deformable materials, such as nano-silver, etc. The characteristics of the deformable materials include that it can change shape when stretched without breaking, and can return to its original shape after stretching. In another embodiment, materials such as indium tin oxide can also be used for the touch electrodes.

Specifically, when one first slit is provided, the first slit 140 is located on the center line of the short side of the strip-shaped electrode 130. The central point of the first slit 140 coincides with the central point of the strip-shaped electrode 130, and the length of the first slit 140 is smaller than the length of the long side of the strip-shaped electrode 130. In this embodiment, only one first slit 140 is provided in the middle of the strip-shaped electrode 130, and is arranged at the center of the strip-shaped electrode 130. When the touch electrode is curled, the sub-electrodes 131 on both sides of the first slit 140 have the same area, and can be deformed more uniformly during the deformation process to avoid cracking.

Specifically, when the strip-shaped electrode in this embodiment is rectangular, in this embodiment, the ratio of the length of the long side to the length of the short side of the strip-shaped electrode is 2:1, the length of the long side of the strip-shaped electrode is 4 mm, and the length of the short side of the strip-shaped electrode is 2 mm, as an example. For the above embodiment in which only one first slit 140 is provided, the first slit 140 is arranged at 1 mm from the short side, and the length of the first slit 140 is less than 4 mm.

Figure 6:
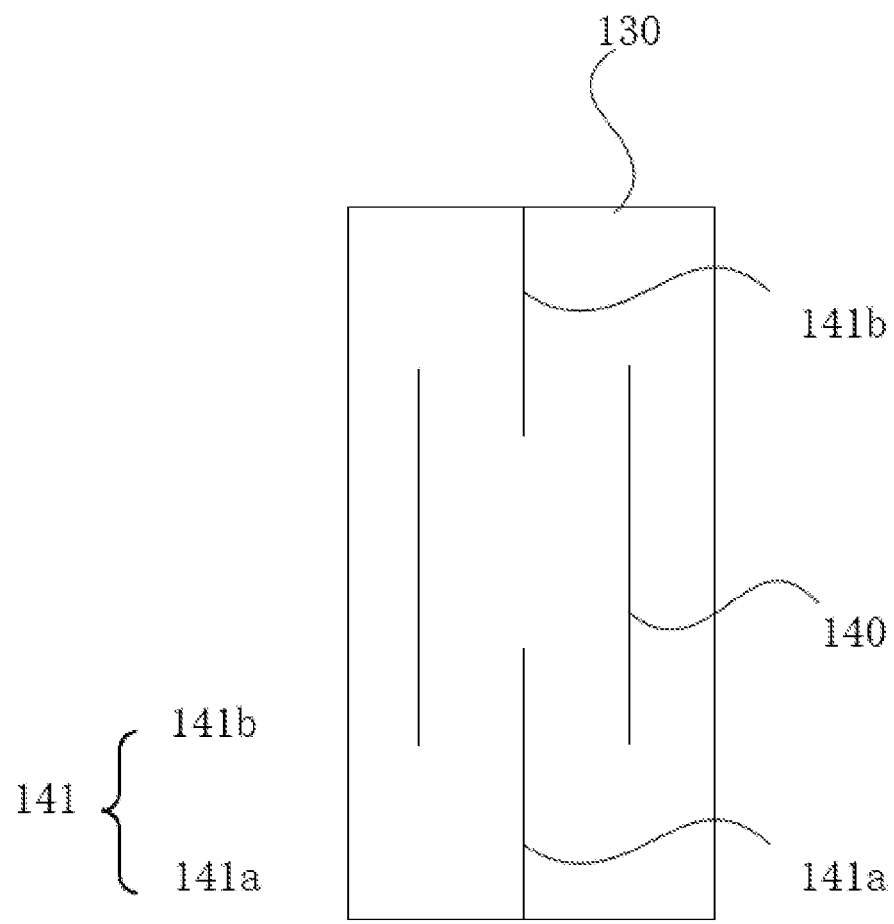
FIG. 6 is a schematic diagram of a third strip-shaped electrode according to the present application.
Figure 7:
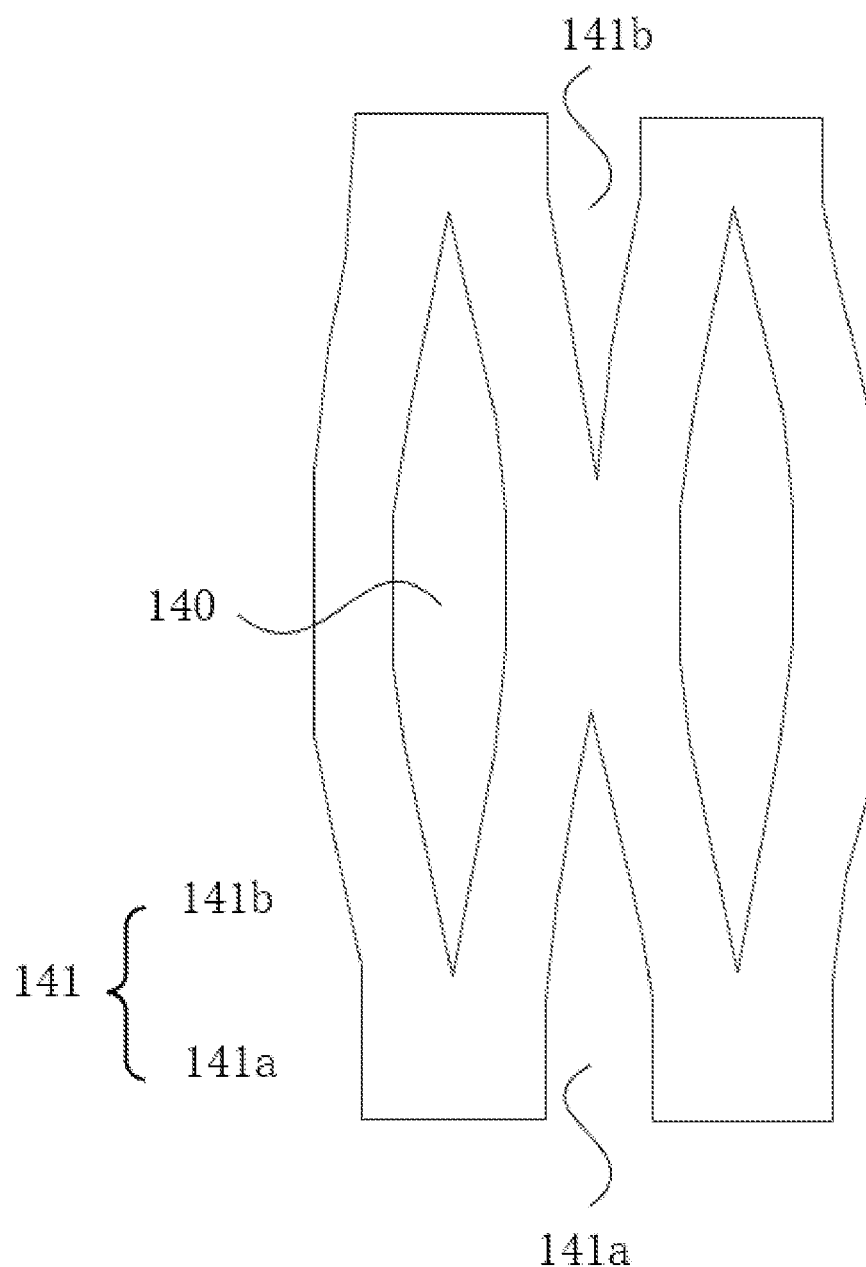
FIG. 7 is a schematic diagram of the third strip-shaped electrode according to the present application in a curled state.

FIG. 6 is a schematic diagram of a third strip-shaped electrode according to the present application. FIG. 7 is a schematic diagram of the third strip-shaped electrode according to the present application in a curled state. As shown in FIGS. 6-7, in this embodiment, the strip-shaped electrode 130 is provided with at least two first slits 140. The strip-shaped electrode 130 further includes at least one second slit 141. The second slit 141 is arranged along the first direction Y The second slit 141 is disposed between the adjacent first slits 140. The second slit is equidistant from the two first slits. The second slit 141 includes a first segment 141a and a second segment 141b. The first segment 141a extends from the short side of the strip-shaped electrode 130 along the first direction Y. The second segment 141b extends from the other short side of the strip-shaped electrode 130 along the first direction Y. The first segment 141a and the second segment 141b are collinear and not connected.

In this embodiment, in order to make the touch film layer 30 have a greater degree of curling, multiple (including two or more) first slits 140 can be set in the strip-shaped electrode 130. The plurality of first slits 140 divide the strip-shaped electrode 130 into a plurality of sub-electrodes 131 with equal widths, and each first slit 140 does not completely divide the strip-shaped electrode 130 into two independent sub-electrodes 131. In this embodiment, a second slit 141 is further provided between the two first slits 140, and the second slit 141 is completely different from the first slits 140. The first slit 140 is mainly aimed at the central region of the strip-shaped electrode 130, and the second slit 141 is mainly aimed at both ends of the strip-shaped electrode 130 in the long side direction. The second slit 141 cooperates with the first slits 140 to enable the touch film layer 30 to have a stronger degree of curling. In this embodiment, when the touch film layer 30 is rolled, the strip-shaped electrode 130 can be deformed into a mesh structure as shown in FIG. 5. FIG. 5 also shows schematic diagrams of the deformation of the strip-shaped electrode 130 under the states of curling degrees of 11% and 58%, respectively.

It should be understood that this embodiment only exemplifies the case where two first slits 140 and one second slit 141 are provided. In practice, the numbers of the first slits 140 and the second slits 141 can be set as required. In this embodiment, the first slit 140 and the second slit 141 can be formed by etching during the film layer manufacturing process, and the size of the slit is closely related to the material of the strip-shaped electrode and the area of the strip-shaped electrode. For example, when nano-silver material is used, the length of the slit can be larger, so as to realize bending or curling at a larger angle, while when indium tin oxide is used, a relatively narrow size is selected. Furthermore, the width of the slit in this embodiment is extremely small. When not crimped, the slit does not form a via-like hole. Furthermore, although the slit is formed, the sub-electrodes on both sides of the slit are still in a contact state, and the width of the slit can be chosen to be in the order of microns or nanometers.

Furthermore, when the strip-shaped electrode 130 in FIG. 2 of the present application is elongated with arc edges, it is also conceivable to set the second slit 141. The second slit 141 is provided at the midline position of the upper short side 132 and the lower short side 133, so that the two ends of the strip-shaped electrode 130 are deformed during curling and bending, and the width of the second slit 141 becomes larger. Correspondingly, when the strip-shaped electrode 130 is used as the first touch electrode 111, when the two adjacent first touch electrodes are connected by a first connection wire, and the first connection wire is a metal connection bridge, then the connection between the metal connection bridge and the strip-shaped electrode 130 can be arranged on both sides of the second slit, so as to prevent the strip-shaped electrode 130 from being deformed causing the connection of the metal connection bridge to break. Correspondingly, when the strip-shaped electrode 130 is used as the second touch electrode 121, the second connection wire is preferably connected to the middle of the strip-shaped electrode 130.

Figure 8:
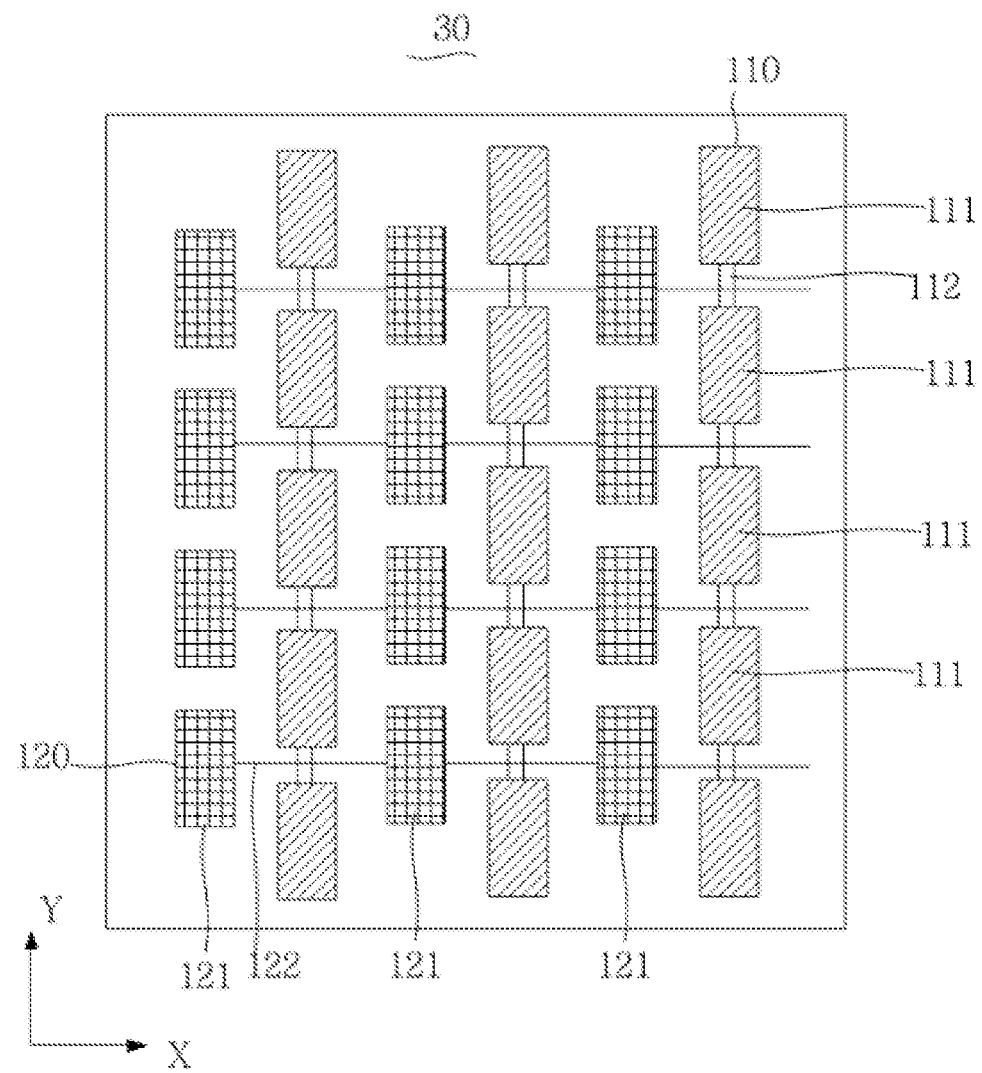
FIG. 8 is a schematic diagram of a first touch film layer according to the present application.

FIG. 8 is a schematic diagram of a first touch film layer of the present application. As shown in FIG. 8, in the second direction X, multiple columns of the first touch electrodes 111 and multiple columns of the second touch electrodes 121 are arranged at intervals, and in the first direction Y, the first touch electrode 111 and the second touch electrode 121 are arranged in a staggered manner, and both ends of the first touch electrode 111 in the first direction Y are respectively aligned with the midline of the adjacent second touch electrodes 121 in the length direction. It should be understood that the distances between the first touch electrodes 111 and the second touch electrodes 121 in FIG. 8 are small. In this embodiment, four second touch electrodes 121 are present around each first touch electrode 111, and four first touch electrodes 111 are present around each second touch electrode 121. Along the first direction Y, each column of first touch electrodes 111 is a column touch detection channel. Along the second direction X, each row of second touch electrodes 121 is a row touch detection channel. Each column touch detection channel is externally connected to a touch circuit. Each row touch detection channel is externally connected to the touch circuit. The touch position can be accurately positioned through the column touch detection channel and the row touch detection channel.

Specifically, the touch film layer further includes an insulation layer 150 and a metal layer 151. The insulation layer 150 is disposed between the touch electrode layer and the metal layer 151. The metal layer 151 includes a plurality of second connection wires. The second connection wire is a metal connection bridge. The running direction of the second connection wire is parallel to the second direction. Two ends of the second connection wire are respectively connected to two adjacent second touch electrodes arranged along the second direction through via holes. The touch electrode layer further includes a plurality of first connecting lines. The first connection wire is used to connect two adjacent first touch electrodes arranged along the first direction. The first connection wire is formed in the same manufacturing procedure as the first touch electrode.

The running direction of the first connection wire 112 is parallel to the first direction Y. The running direction of the second connection wire 122 is parallel to the second direction X. The first connection wire 112 is used to connect two adjacent first touch electrodes 111 arranged along the first direction Y. The second connection wire 122 is used to connect two adjacent second touch electrodes 121 arranged along the second direction X. The first touch electrodes 111 are connected along the first direction Y through the first connection wire 112 and form a first touch electrode group 110. The first touch electrode group 110 is a column touch detection channel. Correspondingly, the plurality of second touch electrodes 121 are connected along the second direction X through the second connection wire 122 to form a second touch electrode group 120. The second touch electrode group 120 is a row touch detection channel. In this embodiment, the second connection wire 122 is a metal connection bridge. The first connection wire 112 is formed in the same manufacturing procedure as the first touch electrodes 111.

The second connection wire 122 in this embodiment is a metal connection bridge, which adopts a metal manufacturing process, and its ductility is much better than that of the first touch electrodes 111 and the second touch electrodes 121. The first touch electrodes 111 and the second touch electrodes 121 of the present application are formed by using a transparent conductive layer. It is also needed to consider that the film layer of the first connection wire 112 will not be broken when the touch film layer 30 is curled. This specifically includes the following.

In one embodiment, the width of the first connection wire 112 is equal to the width of the short side of the second touch electrodes 121. That is, in the first direction Y, each column of the second touch electrodes 121 is a complete touch electrode line with the same width. Correspondingly, the first slit 140 and the second slit 141 can also be set in the first connection wire 112. The first slit 140 needs to be aligned with the first slits 140 in the adjacent first touch electrode 111 and the second touch electrode 121, and the second slit 141 needs to be aligned with the second slits 141 in the adjacent first touch electrode 111 and the second touch electrode 121. During the curling process of the touch film layer 30, the entire column of touch electrode lines is deformed to form a network structure.

In another embodiment, the line width of the first connection wire112 is smaller than the short side length of the first touch electrode 111. In addition, there are multiple first connecting lines 112, respectively connected to the corresponding sub-electrodes 131 between two adjacent second slits 141. In this way, even when the first touch electrode 111 is deformed, the connection between the first connection wire 112 and the first touch electrode 111 will not be damaged. Furthermore, the line width of the first connection wire 112 is smaller, and so the touch film layer 30 is not easily damaged during the curling process.

Figure 9:
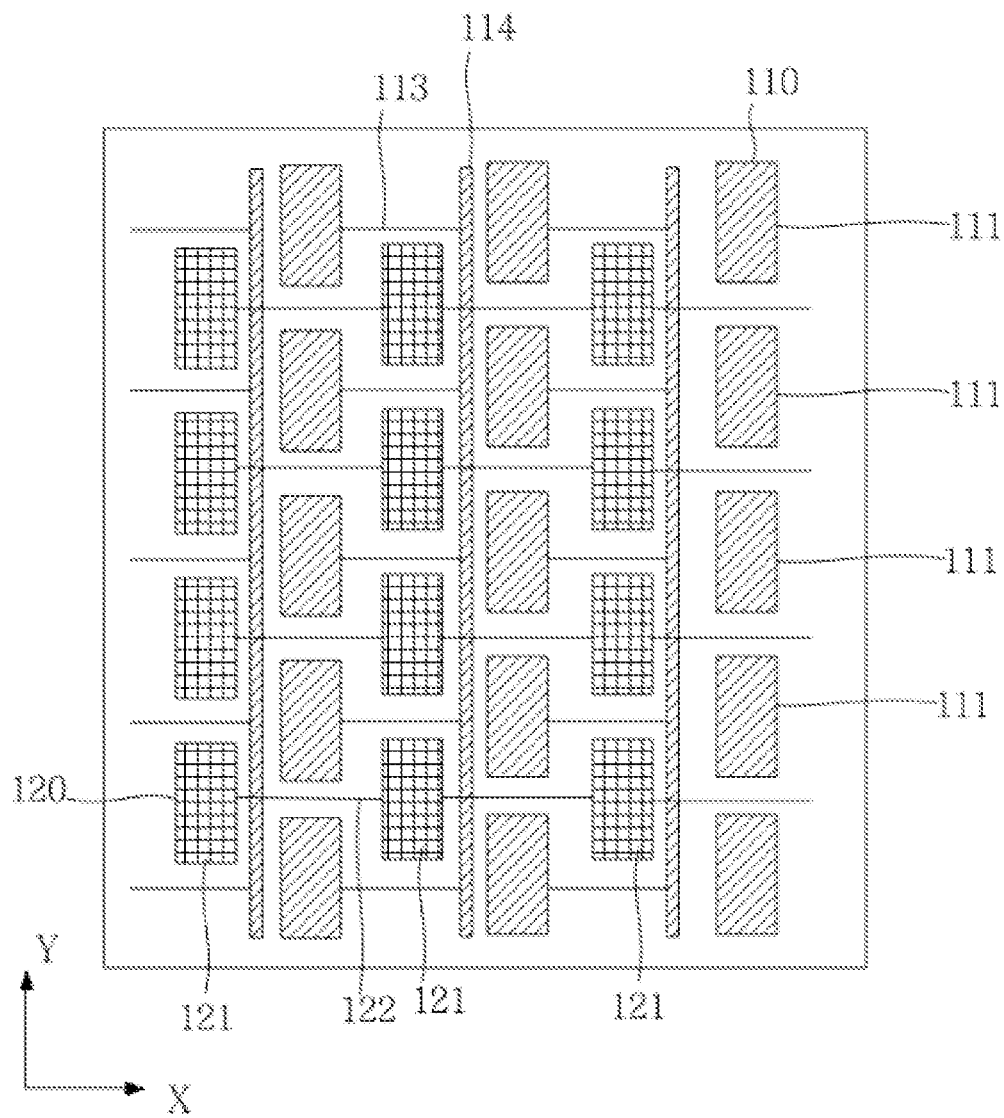
FIG. 9 is a schematic diagram of a second touch film layer according to the present application.

FIG. 9 is a schematic diagram of a second touch film layer of the present application. As shown in FIG. 9, the touch film layer 30 includes a plurality of second connection wires 122, a plurality of third connection wires 113 and a plurality of first touch channels 114. The running directions of the second connection wire 122 and the third connection wire 113 are parallel to the second direction X. The second connection wire 122 is used to connect two adjacent second touch electrodes 121 arranged along the second direction X. One of the first touch channels 114 is arranged in parallel with a column of the first touch electrodes 111. Each of the touch electrodes in a column of the first touch electrodes 111 is connected to the first touch channel 114 through the respective third connection wire 113. The first touch channel 114 is externally connected to the touch control unit.

In this embodiment, compared with the previous embodiment, the first connection wire 112 in the first direction Y is no longer provided, and all provided are the second connection wire 122 and the third connection wire 113 in the second direction X. The column touch detection circuits include a touch channel, where a column of multiple first touch electrodes 111 are each connected to the first touch channel 114 through the respective third connection wire 113 running in the second direction X. Compared with the previous embodiment, the present embodiment does not have the problem of the first connection wire 112 being broken, and the third connection wire 113 can also be formed in the form of a metal connection bridge.

In this embodiment, the width of the first touch channel 114 is in the order of microns, and the width of the short sides of the second touch electrodes 121 is in the order of millimeters. The first touch channel 114 and the first touch electrode 111 can be formed by the same manufacturing procedure. It should be noted that, when the above-mentioned second connection wire 122 and third connection wire 113 adopt the metal connection bridge structure, it is necessary to avoid the sub-pixel region of the display panel to increase the aperture ratio.

Figure 10:
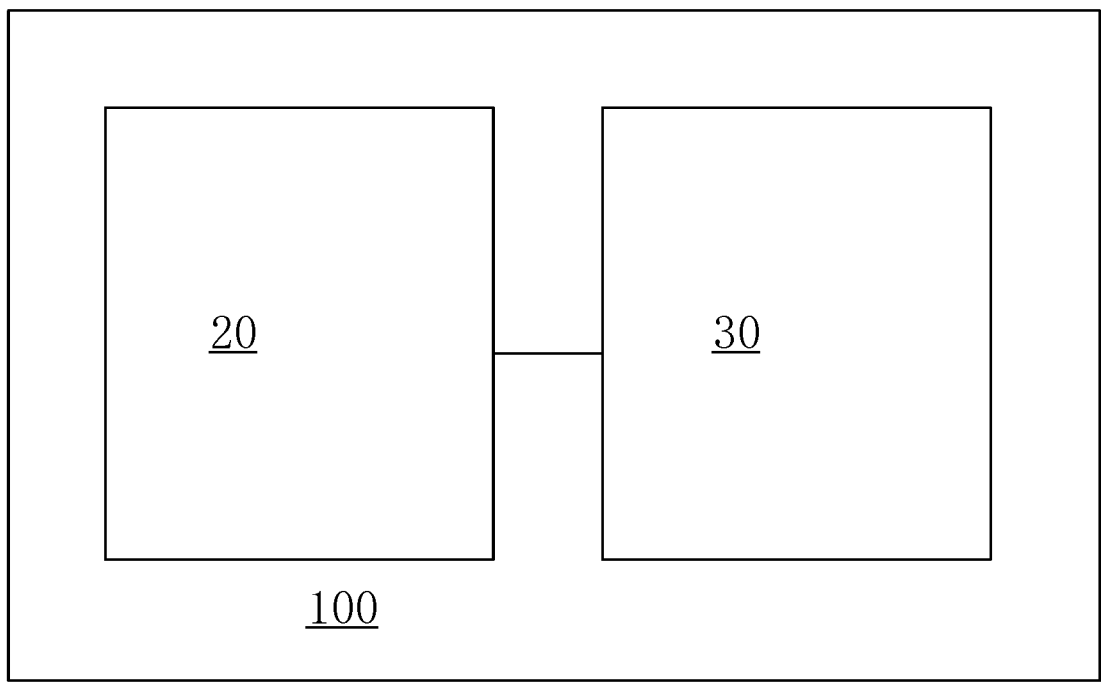
FIG. 10 is a schematic diagram of a flexible display panel according to the present application.

FIG. 10 is a schematic diagram of a flexible display panel according to the present application. As shown in FIG. 10, the present application discloses a touch display panel 10, including a flexible display panel 20 and the touch film layer 30 mentioned in any of the above-mentioned embodiments. The touch film layer is disposed on a light emitting surface of the flexible display panel. Flexible display panels are used to produce foldable screens, rollable screens, etc., and are more suitable for foldable screens and rollable screens that are unfolded outward. The touch electrodes designed in this application are more suitable for the folded part of the foldable screen and the screen part that is not displayed when the rollable screen is rolled.

In the present application, the touch electrodes in the touch film layer 30 are arranged as a pattern of strip-shaped electrodes 130, and the short sides of the strip-shaped electrodes 130 are set corresponding to the direction in which the touch film layer 30 is curled. When the touch film layer 30 is curled, the short side of the touch electrode is relatively short, which is not easy to break. At the same time, the present application is provided with a slit in the strip-shaped electrode 130. When the touch film layer 30 is curled, the strip-shaped electrode 130 deforms at the slit position, the width of the slit becomes larger, and the sub-electrodes 131 on both sides of the slit move outward. By actively setting the slit, the strip-shaped electrode 130 is actively moved when curled, and during the movement, the two sub-electrodes 131 of the strip-shaped electrode 130 are always in a connected state at both ends, which will not damage the touch electrode. It avoids the problem that the film layer is passively ruptured during curling, resulting in uncontrollable cracking lines and damage to the touch electrode. Furthermore, through the arrangement of the touch electrodes of the present application, the touch pattern can be deformed to increase the stretch resistance, the screen body can withstand greater stress, so as to meet the requirement of a smaller bending radius, so that the degree of curling can be larger, which is conducive to reducing the size of the whole machine.

It should be noted that the inventive concept of the present application can be formed into many embodiments, but the length of this application document is limited and so these embodiments cannot be enumerated one by one. The technical features can be arbitrarily combined to form a new embodiment, and the original technical effect may be enhanced after the various embodiments or technical features are combined.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. A touch film layer, comprising a touch electrode layer; wherein the touch electrode layer comprises a plurality of first touch electrode groups and a plurality of second touch electrode groups;
wherein each first touch electrode group is formed by a plurality of first touch electrodes arranged along a first direction that are connected together, and each second touch electrode group is formed by a plurality of second touch electrodes arranged along a second direction that are connected together;
wherein the first direction intersects the second direction to form an included angle of 90 degrees; wherein the second direction is defined as a direction in which the touch film layer is curled or bent;
wherein the plurality of first touch electrodes and the plurality of second touch electrodes are strip-shaped electrodes;
wherein a long axis or long side of each strip-shaped electrode is parallel to the first direction, and wherein a short axis or short side of each strip-shaped electrode is parallel to the second direction;
wherein the plurality of first touch electrodes and the plurality of second touch electrodes are located in a same film layer; wherein adjacent second touch electrodes are connected together by a metal connection bridge;

wherein each strip-shaped electrode is rectangular, or quadrilateral, or elliptical, or elongated with arc edges; wherein a ratio of a length of the long side or long axis of each strip-shaped electrode to a length of the short side or short axis is greater than or equal to 2:1, and wherein a length of the long side or long axis of each strip-shaped electrode lies in the range of 3.5 mm-5.5 mm;

wherein at least one first slit is defined in each strip-shaped electrode, and wherein the at least one first slit is oriented along the first direction; wherein when the touch film layer is curled along the second direction, a slit width of the first slit becomes greater, and the strip-shaped electrode is separated into at least two sub-electrodes; wherein two ends of one of the two sub-electrodes in the first direction of the strip-shaped electrode are electrically connected to two ends of the other of the two sub-electrodes in the first direction, respectively;

wherein when the touch film layer is not curled, the two sub-electrodes on both sides of the first slit are in contact at the first slit; and wherein when the touch display panel is curled along the second direction, the two sub-electrodes on both sides of the first slit are separated, and wherein a width of the first slit decreases in a direction from a middle to each of both ends.

2. The touch film layer as recited in claim 1, wherein when there is defined only one first slit in each strip-shaped electrode, a central point of the first slit coincides with a central point of the respective strip-shaped electrode, and wherein a length of the first slit is less than a length of the respective strip-shaped electrode in the first direction.

3. The touch film layer as recited in claim 1, wherein when there are defined at least two first slits in each strip-shaped electrode, the strip-shaped electrode further comprises at least one second slit oriented along the first direction, wherein each of the at least one second slit is disposed between two adjacent first slits, and the second slit is equidistant from the two adjacent first slits;

wherein the second slit comprises a first segment and a second segment, wherein the first segment extends from a short side of the respective strip-shaped electrode along the first direction, the second segment extends from another side of the respective strip-shaped electrode along the first direction, and wherein the first segment and the second segment are collinear and not connected.

4. The touch film layer as recited in claim 1, wherein in the second direction, a plurality of columns of the first touch electrodes and a plurality of columns of the second touch electrodes are alternately arranged at intervals; and wherein in the first direction, the first touch electrodes and the second touch electrodes are staggered.

5. The touch film layer as recited in claim 1, wherein when each strip-shaped electrode is elongated with arc edges, the strip-shaped electrode is narrow in the middle and wide at both ends, and wherein a narrowest portion of the strip-shaped electrode has a width that lies in the range of 0.5 to 1.2 mm.

6. The touch film layer as recited in claim 5, wherein each strip-shaped electrode comprises an upper short side and a lower short side that run parallel to the second direction, and a left arc edge and a right arc edge that connected the upper short side and the lower short side together;

wherein both the left arc edge and the right arc edge are recessed inwardly, and are arranged symmetrically with respect to a midline of the upper short side and the lower short side, and wherein a line connecting midpoints of the left arc edge and the right arc edge is the narrowest portion of the strip-shaped electrode;

wherein a width of each strip-shaped electrode along the first direction has a value greater than or equal to 2 mm.

7. The touch film layer as recited in claim 6, wherein the touch film layer further comprises an insulation layer and a metal layer, wherein the insulation layer is arranged between the touch electrode layer and the metal layer;

wherein the metal layer comprises a plurality of second connection wires, which are metal connection bridges; wherein two ends of each of the second connection wires are respectively connected to two adjacent second touch electrodes arranged along the second direction through via holes, and wherein each second connection wire is connected to a position of the respective second touch electrode that is relatively far away from the narrowest portion of the respective strip-shaped electrode.

8. The touch film layer as recited in claim 6, wherein the touch electrode layer further comprises a plurality of first connection wires, each of which is used to connect adjacent electrodes arranged along the first direction, and wherein the plurality of first connection wires are formed in a same manufacturing procedure as the plurality of first touch electrodes.

9. The touch film layer as recited in claim 8, wherein a width of each first connection wire is equal to a width of the short side of each second touch electrode.

10. The touch film layer as recited in claim 6, wherein the touch film layer comprises a plurality of second connection wires, a plurality of third connection wires, and a plurality of first touch channels; wherein a running direction of each second connection wire and each third connection wire is parallel to the second direction, and wherein each second connection wire is used to connect two adjacent second touch electrodes arranged along the second direction;

wherein each of the first touch channels is disposed in parallel with each column of the first touch electrodes, and wherein the plurality of first touch electrodes in each column of the first touch electrodes is connected to the corresponding first touch channel by the respective third connection wire.

11. A touch display panel, comprising a flexible display panel and a touch film layer arranged on a light-emitting surface of the flexible display panel; wherein the touch film layer comprises a touch electrode layer; wherein the touch electrode layer comprises a plurality of first touch electrode groups and a plurality of second touch electrode groups;

wherein each first touch electrode group is formed by a plurality of first touch electrodes arranged along a first direction that are connected together, and each second touch electrode group is formed by a plurality of second touch electrodes arranged along a second direction that are connected together;

wherein the first direction intersects the second direction to form an included angle of 90 degrees; wherein the second direction is defined as a direction in which the touch film layer is curled or bent;

wherein the plurality of first touch electrodes and the plurality of second touch electrodes are strip-shaped electrodes;

wherein a long axis or long side of each strip-shaped electrode is parallel to the first direction, and wherein a short axis or short side of each strip-shaped electrode is parallel to the second direction, wherein the plurality of first touch electrodes and the plurality of second touch electrodes are located in a same film layer; wherein adjacent second touch electrodes are connected together by a metal connection bridge;

wherein each strip-shaped electrode is rectangular, or quadrilateral, or elliptical, or elongated with arc edges; wherein a ratio of a length of the long side or long axis of each strip-shaped electrode to a length of the short side or short axis is greater than or equal to 2:1, and wherein a length of the long side or long axis of each strip-shaped electrode lies in the range of 3.5 mm-5.5 mm;

wherein at least one first slit is defined in each strip-shaped electrode, and wherein the at least one first slit is oriented along the first direction; wherein when the touch film layer is curled along the second direction, a slit width of the first slit becomes greater, and the strip-shaped electrode is separated into at least two sub-electrodes; wherein two ends of one of the two sub-electrodes in the first direction of the strip-shaped electrode are electrically connected to two ends of the other of the two sub-electrodes in the first direction, respectively;

wherein when the touch film layer is not curled, the two sub-electrodes on both sides of the first slit are in contact at the first slit; and wherein when the touch display panel is curled along the second direction, the two sub-electrodes on both sides of the first slit are separated, and wherein a width of the first slit decreases in a direction from a middle to each of both ends.

12. The touch display panel as recited in claim 11, wherein when there is defined only one slit in each strip-shaped electrode, a central point of the first slit coincides with a central point of the respective strip-shaped electrode, and wherein a length of the first slit is smaller than a length of the strip-shaped electrode in the first direction.

13. The touch display panel as recited in claim 11, wherein when there are defined at least two first slits in each strip-shaped electrode, the strip-shaped electrode further comprises at least one second slit oriented along the first direction, wherein each of the at least one second slit is disposed between adjacent first slits, and wherein the second slit is equidistant from the two adjacent first slits;

wherein the second slit comprises a first segment and a second segment, wherein the first segment extends from a short side of the respective strip-shaped electrode along the first direction, the second segment extends from another short side of the respective strip-shaped electrode along the first direction, and wherein the first segment and the second segment are collinear and not connected.

14. The touch display panel as recited in claim 11, wherein in the second direction, a plurality of columns of the first touch electrodes and a plurality of columns of the second touch electrodes are alternately arranged at intervals; and wherein in the first direction, the first touch electrodes and the second touch electrodes are staggered.

15. The touch display panel as recited in claim 11, wherein when each strip-shaped electrode is elongated with arc edges, the strip-shaped electrode is narrow in the middle and wide at both ends, and wherein a narrowest portion of the strip-shaped electrode has a width that lies in the range of 0.5 to 1.2 mm.

16. The touch display panel as recited in claim 15, wherein each strip-shaped electrode comprises an upper short side and a lower short side that run parallel to the second direction, and a left arc edge and a right arc edge that connected the upper short side and the lower short side together;

wherein both the left arc edge and the right arc edge are recessed inwardly, and are arranged symmetrically with respect to a midline of the upper short side and the lower short side, and wherein a line connecting midpoints of the left arc edge and the right arc edge is the narrowest portion of the strip-shaped electrode;

wherein a width of each strip-shaped electrode along the first direction has a value greater than or equal to 2 mm.

17. The touch display panel as recited in claim 16, wherein the touch film layer further comprises an insulation layer and a metal layer, wherein the insulation layer is arranged between the touch electrode layer and the metal layer;

wherein the metal layer comprises a plurality of second connection wires, which are metal connection bridges; wherein two ends of each of the second connection wires are respectively connected to two adjacent second touch electrodes arranged along the second direction through via holes, and wherein each second connection wire is connected to a position of the respective second touch electrode that is relatively far away from the narrowest portion of the respective strip-shaped electrode.

* * * * *